US012657676B2

(12) United States Patent
Zhu et al.

(10) Patent No.: US 12,657,676 B2
(45) Date of Patent: Jun. 16, 2026

(54) METHOD AND APPARATUS FOR VIDEO PROCESSING, AND READABLE STORAGE MEDIUM

(71) Applicant: BOE TECHNOLOGY GROUP CO., LTD., Beijing (CN)

(72) Inventors: Dan Zhu, Beijing (CN); Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 250 days.

(21) Appl. No.: 18/561,588

(22) PCT Filed: Dec. 23, 2022

(86) PCT No.: PCT/CN2022/141522
§ 371 (c)(1),
(2) Date: Nov. 16, 2023

(87) PCT Pub. No.: WO2024/130715
PCT Pub. Date: Jun. 27, 2024

(65) Prior Publication Data
US 2025/0086763 A1 Mar. 13, 2025

(51) Int. Cl.
*G06T 5/92* (2024.01)
*H04N 19/186* (2014.01)
(52) U.S. Cl.
CPC .............. *G06T 5/92* (2024.01); *H04N 19/186* (2014.11); *G06T 2207/20208* (2013.01)
(58) Field of Classification Search
CPC .............. G06T 5/92; G06T 2207/20208; G06T 2207/10016; H04N 19/186; H04N 19/52

USPC ........................................................ 382/274
See application file for complete search history.

(56) References Cited

U.S. PATENT DOCUMENTS

| | | | |
|---|---|---|---|
| 10,739,783 | B2 | 8/2020 | Seo et al. |
| 11,503,248 | B1 * | 11/2022 | Chang .................... H04N 7/014 |
| 2018/0246521 | A1 * | 8/2018 | Seo ...................... H04N 23/741 |

(Continued)

FOREIGN PATENT DOCUMENTS

| | | |
|---|---|---|
| CN | 107154059 A | 9/2017 |
| CN | 108513059 A | 9/2018 |
| CN | 110415188 B | 11/2019 |

(Continued)

*Primary Examiner* — Jennifer Mehmood
*Assistant Examiner* — Dustin Bilodeau
(74) *Attorney, Agent, or Firm* — LEASON ELLIS LLP

(57) ABSTRACT

A method and an apparatus for video processing, and a non-instantaneous readable storage medium. The method for video processing includes: dividing a plurality of video frames in an initial video into a plurality of video segments; determining, based on one frame of the one or more video frames, a display parameter set of a video segment to which the one frame belongs; adjusting other frames in the video segment based on the display parameter set to acquire an intermediate video segment; performing a high dynamic range conversion on the intermediate video segment to acquire a high dynamic range video segment; generating a high dynamic range video based on the high dynamic range video segment. Each of the plurality of video segments comprises one or more video frames, and the plurality of video frames are consecutive.

19 Claims, 10 Drawing Sheets

(56)                    References Cited

U.S. PATENT DOCUMENTS

2021/0407045 A1* 12/2021 Mironica ................. G06T 3/40
2023/0232116 A1     7/2023 Zhang et al.

FOREIGN PATENT DOCUMENTS

| CN | 112492333 | A | 3/2021 | |
|----|-----------|---|--------|--|
| CN | 113891081 | A | 1/2022 | |
| CN | 114422718 | A | 4/2022 | |
| WO | WO-2021036991 | A1 * | 3/2021 | ........... H04N 23/741 |
| WO | 2022011194 | A1 | 1/2022 | |

* cited by examiner

Frame information

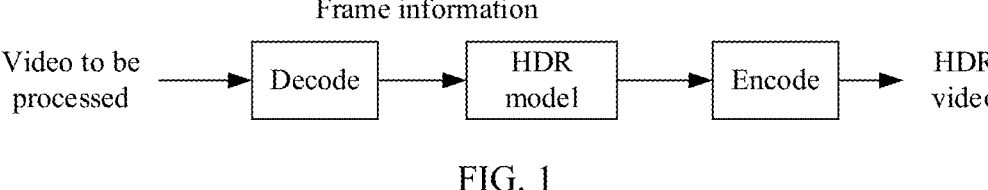

Video to be processed → Decode → HDR model → Encode → HDR video

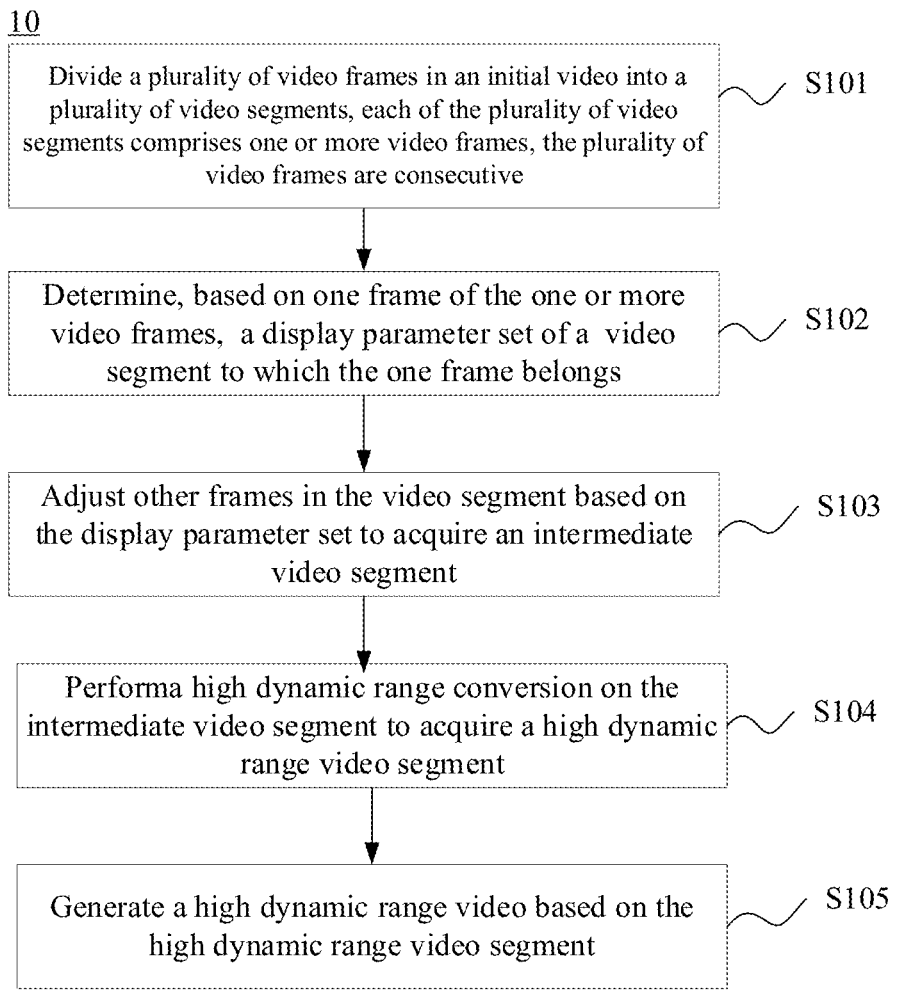

Divide a plurality of video frames in an initial video into a plurality of video segments, each of the plurality of video segments comprises one or more video frames, the plurality of video frames are consecutive    S101

Determine, based on one frame of the one or more video frames, a display parameter set of a video segment to which the one frame belongs    S102

Adjust other frames in the video segment based on the display parameter set to acquire an intermediate video segment    S103

Perform a high dynamic range conversion on the intermediate video segment to acquire a high dynamic range video segment    S104

Generate a high dynamic range video based on the high dynamic range video segment    S105

FIG. 2

ResNet

CSA

120

Apparatus for video
processing
40/90/600

FIG. 15

METHOD AND APPARATUS FOR VIDEO PROCESSING, AND READABLE STORAGE MEDIUM

CROSS-REFERENCE TO RELATED PATENT APPLICATIONS

This application is a U.S. National Stage Application under 35 U.S.C. § 371 of International Patent Application No. PCT/CN2022/141522 filed Dec. 23, 2022, which is incorporated by reference in its entirety.

TECHNICAL FIELD

Embodiments of the present disclosure relate to a method for video processing, an apparatus for video processing, and a non-instantaneous readable storage medium.

BACKGROUND

The high dynamic range (HDR) image, compared with ordinary images, can provide larger dynamic range and more image details, can more accurately record most of the color and lighting information of real scenes, and can show rich color details and levels of light and shade. According to the low dynamic range (LDR) images of different exposure times, the LDR image with the best details corresponding to each exposure time is used to synthesize the final HDR image, which can better reflect the visual effects of people in a real environment. The HDR technology can be applied to fields that require high image quality, such as medical imaging, video surveillance, satellite remote sensing, and computer vision.

SUMMARY

At least one embodiment of the present disclosure provides a method for video processing, which includes: dividing a plurality of video frames in an initial video into a plurality of video segments; determining, based on one frame of the one or more video frames, a display parameter set of a video segment to which the one frame belongs; adjusting other frames in the video segment to which the one frame belongs based on the display parameter set to acquire an intermediate video segment; performing a high dynamic range conversion on the intermediate video segment to acquire a high dynamic range video segment; and generating a high dynamic range video based on the high dynamic range video segment. Each of the plurality of video segments comprises one or more video frames, and the plurality of video frames are consecutive.

For example, in the method provided in at least one embodiment of the present disclosure, the display parameter set includes the first display parameter, the second display parameter, and the third display parameter. The first display parameter and the third display parameter are used for adjusting the brightness of the video frame, and the second display parameter is used to adjust the contrast of the video frame.

For example, in the method provided in at least one embodiment of the present disclosure, the first display parameter is used to adjust the overall brightness level of the video frame, and the third display parameter is used to locally adjust the brightness level of the video frame.

For example, in the method provided in at least one embodiment of the present disclosure, dividing a plurality of video frames in an initial video into a plurality of video segments, includes: calculating the similarity between each video frame and a previous video frame in turn according to the playback order of a plurality of video frames in the initial video; and dividing the initial video into a plurality of video segments based on the calculated similarity between every two adjacent video frames.

For example, in the method provided in at least one embodiment of the present disclosure, before the calculating the similarity between each video frame and a previous video frame in turn according to the playback order of a plurality of video frames in the initial video, the method further includes: performing a dimensionality reduction process on each initial video frame in the initial video to acquire the plurality of video frames.

For example, in the method provided in at least one embodiment of the present disclosure, calculating the similarity between each video frame and a previous video frame in turn, includes: for a video frame in the plurality of video frames, based on the mean value of the image data of the video frame and the mean value of the image data of the previous video frame, the standard deviation of the image data of the video frame and the standard deviation of the image data of the previous video frame, and the covariance of the image data of the video frame and the image data of the previous video frame, determining the structural similarity between the video frame and the previous video frame; and determining a similarity between the video frame and the previous video frame based on the structural similarity between the video frame and the previous video frame.

For example, in the method provided in at least one embodiment of the present disclosure, determining, based on one frame of the one or more video frames, the display parameter set of the video segment to which the one frame belongs, includes: performing parameter analysis on the initial video frame using an image processing network to acquire the display parameter set. The image processing network includes the first image analysis module and the second image analysis module, the first image analysis module is used for performing feature extraction on the initial video frame to acquire the first intermediate video frame; and the second image analysis module is used for performing feature extraction and scale transformation on the first intermediate video frame to output the display parameter set.

For example, in the method provided in at least one embodiment of the present disclosure, the first image analysis module includes the first convolutional layer, an average pooling layer, an activation layer, and an instance regularization normalization layer; the second image analysis module includes the second convolutional layer and a global average pooling layer.

For example, in the method provided in at least one embodiment of the present disclosure, the image processing network includes a plurality of the first image analysis modules.

For example, in the method provided in at least one embodiment of the present disclosure, adjusting other frames in the video segment to which the one frame belongs based on the display parameter set to acquire an intermediate video segment, comprises: adjusting all video frame data in each video segment based on the following equation according to the display parameter set corresponding to each video frame:

$$X_{out} = w1 \times X_{in}^{w2} + w3,$$

where $X_{in}$ represents an input frame, $X_{out}$ represents an output frame, and w1, w2, and w3 are respectively the first display parameter, the second display parameter, and the third display parameter.

For example, in the method provided in at least one embodiment of the present disclosure, performing a high dynamic range conversion on the intermediate video segment to acquire a high dynamic range video segment, includes: performing a high dynamic range conversion on the intermediate video segment using a video processing network. The video processing network includes a basic network and a weight network; the basic network is used to perform feature extraction and feature reconstruction on an input frame to acquire a high dynamic range output frame; and the weight network is used to perform feature extraction on the input frame to acquire a feature matrix parameter, and perform information rectification on the basic network based on the feature matrix parameter.

For example, in the method provided in at least one embodiment of the present disclosure, the basic network includes at least one information conditioning node, and the information conditioning node is used to integrate feature extraction information of the basic network for the input frame and feature matrix parameter information of the weight network.

For example, in the method provided in at least one embodiment of the present disclosure, the basic network includes the first information conditioning node, the second information conditioning node, the third information conditioning node, the fourth information conditioning node, and the fifth information conditioning node.

For example, in the method provided in at least one embodiment of the present disclosure, the weight network includes at least one feature rectification network, the feature rectification network comprises at least one attention module. The attention module performing feature extraction on input information using two channels, includes: performing local feature extraction on the input frame using a first channel to acquire the first feature; performing global feature extraction on the input frame using the second channel to acquire the second feature; and fusing the first feature and the second feature to acquire output information.

For example, in the method provided in at least one embodiment of the present disclosure, the weight network includes the first feature rectification network, the second feature rectification network, and the third feature rectification network. The method further includes: inputting the input frame into the first feature rectification network to acquire the first feature parameter matrix; inputting the first feature parameter matrix into the third information conditioning node; inputting the first feature parameter matrix and the input frame after being feature channel rearranged into the second feature rectification network to acquire the second feature parameter matrix; inputting the second feature parameter matrix into the second information conditioning node and the fourth information conditioning node; inputting the second feature parameter matrix and the input frame after being feature channel rearranged into the third feature rectification network to acquire the third feature parameter matrix; and inputting the third feature parameter matrix into the first information conditioning node and the fifth information conditioning node.

For example, the method provided in at least one embodiment of the present disclosure, further includes: acquiring the first sample data which includes the first version SDR image and the first version HDR image, the first version HDR image corresponding to the first version SDR image being used as the first version ground truth image; inputting the first version SDR image into a video processing network to acquire the first version predicted image corresponding to the first version SDR image; inputting the first version predicted HDR image and the first version ground truth image into the first loss function to acquire the first loss function value; and adjusting a model parameter of the video processing network based on the first loss function value; acquiring the second sample data which includes the second version SDR image and the second version HDR image, the second version HDR image corresponding to the second version SDR image being used as the second version ground truth image; inputting the second version SDR image into the image processing network and the video processing network that has been trained to acquire a second version predicted HDR image corresponding to the second version SDR image; fixing a parameter of the video processing network; inputting the second version predicted HDR image and the second version ground truth image into the second loss function to acquire the second loss function value; and adjusting model parameters of the image processing network based on the second loss function value.

For example, the method provided in at least one embodiment of the present disclosure, further includes: acquiring the third sample data which includes the third version SDR image and the third version HDR image, the third version HDR image corresponding to the third version SDR image being used as the third version ground truth image; inputting the third version SDR image into the image processing network and the video processing network to acquire the third version predicted HDR image corresponding to the third version SDR image; inputting the third version predicted HDR image and the third version ground truth image into the third loss function to acquire the third loss function value; and adjusting model parameters of the image processing network and the video processing network based on the third loss function value.

At least one embodiment of the present disclosure also provides an apparatus for video processing, including: a division module, an acquisition module and a processing module. The division module is configured to divide a plurality of video frames in an initial video into a plurality of video segments, each of the plurality of video segments includes one or more video frames, and the plurality of video frames are consecutive. The acquisition module is configured to determine, based on one frame of the one or more video frames, a display parameter set of a video segment to which the one frame belongs; and adjust other frames in the video segment to which the one frame belongs based on the display parameter set to acquire an intermediate video segment. The processing module is configured to perform a high dynamic range conversion on the intermediate video segment to acquire a high dynamic range video segment; and generate a high dynamic range video based on the high dynamic range video segment.

At least one embodiment of the present disclosure also provides an apparatus for video processing, which includes: a processor and a memory. The memory includes one or more computer program modules. The one or more computer program modules are stored in the memory and are configured to be executed by the processor, and the one or more computer program modules include instructions for executing the method for video processing in any of the above embodiments.

At least one embodiment of the present disclosure also provides a non-instantaneous readable storage medium storing computer instructions. The computer instructions upon execution by a processor, cause the processor to execute the method for video processing in any of the above embodiments.

BRIEF DESCRIPTION OF THE DRAWINGS

In order to illustrate the technical solutions of the embodiments of the present disclosure more clearly, the drawings of the embodiments are briefly introduced below. Apparently, the drawings described below only relate to some embodiments of the present disclosure, rather than limiting the present disclosure.

FIG. 1 is a schematic block diagram of a method for HDR video generation according to at least one embodiment of the present disclosure;

FIG. 2 is a schematic flowchart of a method for video processing according to at least one embodiment of the present disclosure;

FIG. 15 is a schematic block diagram of an electronic device according to at least one embodiment of the present disclosure.

DETAILED DESCRIPTION

Figure 3:
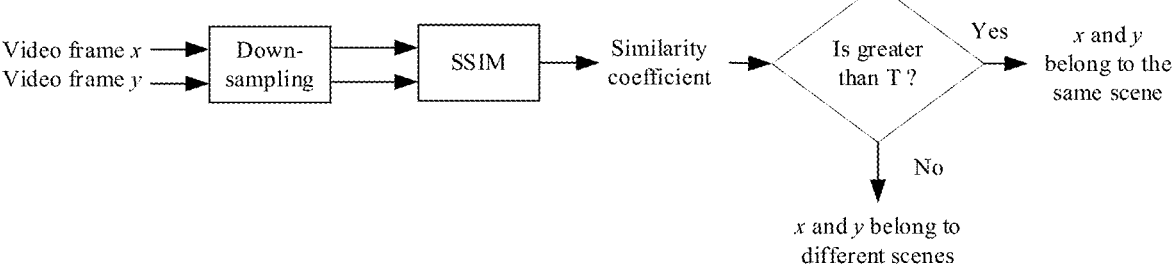
FIG. 3 is a flow chart of video scene partition according to at least one embodiment of the present disclosure.

In order to make objects, technical details and advantages of the embodiments of the present disclosure apparent, the technical solutions of the embodiments are described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Flowcharts are used in the present disclosure to illustrate the operations performed by the system according to the embodiments of the present application. It should be understood that the preceding or following operations are not necessarily performed in an exact order. Instead, various steps may be processed in reverse order or concurrently, as desired. At the same time, other operations can be added to these procedures, or a certain step or steps can be removed from these procedures.

Unless otherwise defined, all the technical and scientific terms used herein have the same meanings as commonly understood by those of ordinary skill in the art to which the present disclosure belongs. The terms "first", "second", and the like., which are used in the description and the claims of the present disclosure, are not intended to indicate any sequence, amount or importance, but used to distinguish various components. Similarly, the terms "a", "an", "the", or the like are not intended to indicate a limitation of quantity, but indicate that there is at least one. The terms, such as "comprise/comprising", "include/including", or the like are intended to specify that the elements or the objects stated before these terms encompass the elements or the objects and equivalents thereof listed after these terms, but not preclude other elements or objects. The terms, such as "connect/connecting/connected", "couple/coupling/coupled", or the like, are not limited to a physical connection or mechanical connection, but may include an electrical connection/coupling, directly or indirectly. The terms, "on", "under", "left", "right", or the like are only used to indicate relative position relationship, and when the position of the object which is described is changed, the relative position relationship may be changed accordingly.

FIG. 1 is a schematic block diagram of a method for HDR video generation according to at least one embodiment of the present disclosure.

For example, in at least one embodiment of the present disclosure, as illustrated in FIG. 1, a simple HDR task can be understood as using a single HDR model (i.e., an HDR image generation algorithm) to process an entire video. For example, after decoding the video to be processed, the frame information of each video frame/video frame is input to the HDR model, which is used to map a frame (e.g., a standard dynamic range (SDR) image or an LDR image, etc.) to an HDR image, and the mapping processing may include dynamic range extension, color gamut range extension, color grading processing of the image, and the like. Then, the output information of the HDR model is encoded to generate an HDR video. The HDR video generation method illustrated in FIG. 1 requires that the video contents are relatively simple, such as HD TV dramas and movies that have been broadcasted on HD channels, and the overall brightness, contrast, and color information of the video can basically remain consistent.

Complex HDR tasks can be understood as the source scenes are complex, such as documentaries, TV dramas of the same series, or variety shows divided into several parts, each of which may be slightly different in terms of the brightness, contrast, and color. In this case, only using a single HDR model cannot complete the processing of complex sources. When encountering a scene that cannot be processed by a single HDR model, seeking a professional colorist for color grading will greatly increase the cost.

At least to overcome the above technical problems, at least one embodiment of the present disclosure provides a method for video processing, including: dividing a plurality of video frames in an initial video into a plurality of video segments; determining, based on one frame of the one or more video frames, a display parameter set of a video segment to which the one frame belongs; adjusting other frames in the video segment to which the one frame belongs based on the display parameter set to acquire an intermediate video segment; performing a high dynamic range conversion on the intermediate video segment to acquire a high dynamic range video segment; and generating a high dynamic range video based on the high dynamic range video segment. Each of the plurality of video segments comprises one or more video frames, and the plurality of video frames are consecutive.

Correspondingly, at least one embodiment of the present disclosure further provides an apparatus for video processing and a non-instantaneous readable storage medium corresponding to the above method for video processing.

Through the method of video processing according to at least one embodiment of the present disclosure, the initial video can be divided into one or more video segments based on scene partitioning, the display parameter set corresponding to each video segment can be acquired, and the video frame in the video segment can be adjusted based on the display parameter set, so as to obtain a high dynamic range video segment, and further generate a high dynamic range video, so that a single HDR model can process the initial video with complex scenes, and thus effectively improving the quality and efficiency of generating HDR video.

The video processing method provided according to at least one embodiment of the present disclosure is non-limitingly described below through several examples or embodiments. As described below, different characters in these specific examples or embodiments may be combined with each other without conflicting with each other, thereby obtaining new examples or embodiments, and all of these new examples or embodiments also should be within the scope of the present disclosure.

FIG. 2 is a schematic flowchart of a method for video processing according to at least one embodiment of the present disclosure;

For example, as illustrated in FIG. 2, at least one embodiment of the present disclosure provides a method for video processing 10. For example, in the embodiments of the present disclosure, the method for video processing 10 can be applied to any application scenario that needs to generate the HDR image/video, for example, it can be applied to the display, the video camera, the camera, the video player, the mobile terminal, and the like, and can also be applied to other aspects, which is not limited in the embodiments of the present disclosure. As illustrated in FIG. 2, the method for video processing 10 may include the following operations S101 to S105.

S101: dividing a plurality of video frames in an initial video into a plurality of video segments. Each of the plurality of video segments includes one or more video frames, and the plurality of video frames are consecutive.

S102: determining, based on one frame of the one or more video frames, a display parameter set of a video segment to which the one frame belongs.

S103: adjusting other frames in the video segment to which the one frame belongs based on the display parameter set to acquire an intermediate video segment.

S104: performing a high dynamic range conversion on the intermediate video segment to acquire a high dynamic range video segment.

S105: generating a high dynamic range video based on the high dynamic range video segment.

For example, in the embodiments of the present disclosure, the initial video can be a photographed work, a video downloaded from the network, or a locally stored video, and the like, or it can be an LDR video, an SDR video, and the like, and the embodiments of the present disclosure do not limit it. It should be noted that the initial video may include various video scenes, such as a certain indoor scene, a certain scenic spot scene, and the like, which may not be limited in the embodiments of the present disclosure.

For example, in at least one embodiment of the present disclosure, for step S101, the initial video may be segmented into video segments according to the video scenes. For example, in some examples, a plurality of video frames included in an initial video are divided into a plurality of video segments, each of the video segments includes one or more video frames. For example, each video segment corresponds to a single video scene. For example, in some examples, the initial video is divided into two video segments, the scene corresponding to the former video segment is a classroom, and the scene corresponding to the latter video segment is a playground. It should be noted that the embodiments of the present disclosure do not limit specific scenarios, which may be set according to actual needs.

For example, in at least one embodiment of the present disclosure, various algorithms may be used to divide the initial video according to the scenes, and the embodiments of the present disclosure do not limit this, as long as the scene division function of the video can be implemented, which may be set according to the actual conditions.

For example, in at least one embodiment of the present disclosure, for step S101, dividing a plurality of video frames in an initial video into a plurality of video segments, includes: calculating the similarity between each video frame and a previous video frame in turn according to the playback order of a plurality of video frames in the initial video; and dividing the initial video into a plurality of video segments based on the calculated similarity between every two adjacent video frames.

For example, in at least one embodiment of the present disclosure, before calculating the similarity between each video frame and a previous video frame in turn according to the playback order of a plurality of video frames in the initial video, a dimensionality reduction process is performed on each initial video frame in the initial video to acquire the plurality of video frames. Through the dimensionality reduction process, the computing cost can be greatly saved and the efficiency can be improved.

For example, in at least one embodiment of the present disclosure, calculating the similarity between each video frame and a previous video frame in turn, includes: for each video frame in the plurality of video frames, based on the mean value of the image data of the video frame and the mean value of the image data of the previous video frame, the standard deviation of the image data of the video frame, the standard deviation of the image data of the previous video frame, and the covariance of the image data of the video frame and the image data of the previous video frame, determining the structural similarity between the video frame and the previous video frame; and determining a similarity between the video frame and the previous video frame based on the structural similarity between the video frame and the previous video frame.

FIG. 3 is a flow chart of video scene partition according to at least one embodiment of the present disclosure;

For example, as illustrated in FIG. 3, in at least one embodiment of the present disclosure, a structural similarity (SSIM) algorithm may be used to perform scene partition processing on an initial video. For example, in some examples, the SSIM algorithm is applied to partition the video content scene. Generally, SSIM is used to measure the structural similarity of two images (video frames), and it is an indicator used to measure the similarity of two images (video frames). The larger the value of SSIM, the more similar the two images are. The value range of SSIM is [0,1], and the calculation formula is illustrated in the following equation (1):

$$SSIM(x, y) = \frac{(2\mu_x\mu_y + C1)(2\sigma_{xy} + C2)}{(\mu_x^2 + \mu_y^2 + C1)(\mu_x^2 + \mu_y^2 + C2)}, C1 = (k_1L)^2, C2 = (k_2L)^2 \quad (1)$$

In the above equation (1), x and y respectively represent the two input images (video frames), SSIM(x, y) represents the similarity between the input image x and the input image y, and $\mu_x$ represents the average value/mean value of the image data of the input image x, $\mu_y$ represents the average value/mean value of the image data of the input image y, $$\sigma_x^2$$

represents the standard deviation of the image data of the input image x, $$\sigma_y^2$$

of represents the standard deviation of the image data of the input image y, $\sigma_{xy}$ represents the covariance of the image data of the input images x and y, L represents the dynamic range of the pixel value, for example, for the 8-bit image, L=255-0, for the 8-bit normalized image, L=1.0-0, $k_1$=0.01, and $k_2$=0.03.

For example, in at least one embodiment of the present disclosure, according to the playback order of a plurality of video frames of the initial video, the video frame at the current time point (i.e., the current video frame) may be set as the input image x of the above equation (1), assuming the video frame at the previous time point of the current moment (i.e., the video frame preceding the current video frame) is the input image y of the above equation (1), and the structural similarity between the two adjacent video frames x and y can be calculated by the above equation (1).

For example, in at least one embodiment of the present disclosure, the threshold T is set as 0.5. If the SSIM (x, y) calculated for two adjacent frames (e.g., video frames x and y) is greater than or equal to T, it is considered that the two adjacent images x and y belong to the same scene. If SSIM (x, y)<T, it is considered that the current two frames of images y and x do not belong to the same scene, the video frame x is the last frame of the previous scene, and the video frame y is the first frame of the latter scene.

It should be noted that the value of the threshold T may be set according to actual conditions, which is not limited in the embodiments of the present disclosure.

For example, in at least one embodiment of the present disclosure, because the SSIM algorithm does not require very precise pixel information, a dimensionality reduction process (e.g., the down-sampling operation) is performed, before calculating the similarity between each video frame and the previous video frame, on each initial video frame in the initial video, and then the SSIM is calculated, as illustrated in FIG. 3, so that the computational costs can be significantly saved.

For example, in at least one embodiment of the present disclosure, SSIM is used as the scene partition algorithm. The SSIM algorithm is simple to calculate, requires the video frame information of only two consecutive frames, enables real-time calculation and processing of the video stream, and does not need to analyze the video offline to perform scene partitioning.

For example, in at least one embodiment of the present disclosure, step S102 includes: performing parameter analysis on the initial video frame using an image processing network to acquire the display parameter set. The image processing network includes the first image analysis module and the second image analysis module. The first image analysis module is used for performing feature extraction on the initial video frame to acquire the first intermediate video frame, and the second image analysis module is used for performing feature extraction and scale transformation on the first intermediate video frame to output the display parameter set.

For example, in at least one embodiment of the present disclosure, the initial video frame is the first video frame in the corresponding video segment according to the order of video playback. In this way, the video stream data can be processed in real time, the display parameter set of the current video segment is obtained based on the first video frame in the current video segment, and then other frame images in the current video segment are processed through the display parameter set. Such that, preprocessing is performed only based on the first frame of the current video segment (i.e., the video frame that is the most forward in accordance with the playback order), which can prevent flickering of information such as brightness and contrast between frames during video playback. The same scene has content continuity, and only the information of the first video frame corresponding to the current scene can be used to adjust the display parameter set corresponding to the current scene.

For example, in at least one embodiment of the present disclosure, the initial video frame may be a video frame randomly selected from the belonging video segment, and the embodiments of the present disclosure are not limited to this and may be set according to actual needs.

For example, in at least one embodiment of the present disclosure, the image processing network includes the first image analysis module and the second image analysis module. The first image analysis module is used to perform feature extraction on the initial video frame to acquire the first intermediate video frame, and the second image analysis module is used to perform feature extraction and scale transformation on the first intermediate video frame to output the display parameter set. For example, in some examples, the first image analysis module includes the first convolutional layer, an average pooling layer, an activation layer, and an instance regularization normalization layer. The second image analysis module includes the second convolutional layer and a global average pooling layer. For example, in some examples, the image processing network includes a plurality of first image analysis modules.

It should be noted that, in the embodiments of the present disclosure, the terms "first image analysis module" and "second image analysis module" are used to represent image analysis modules with specific structures respectively, and are not limited to a specific one or a certain type of image analysis module, or a specific order, and may be set according to actual conditions. It should also be noted that the terms "first convolutional layer" and "second convolutional layer" are used to represent the convolutional layer with a specific convolution parameter, and are not limited to a specific one or a certain type of convolutional layer, or a specific order, and can be set according to actual conditions.

Figure 4:
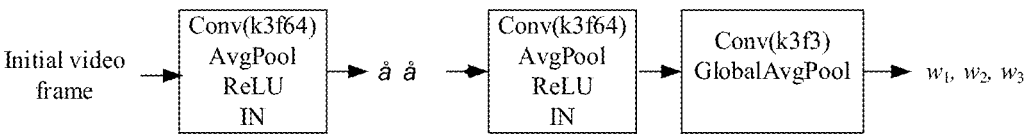
FIG. 4 is a schematic structural diagram of an image processing network according to at least one embodiment of the present disclosure.

FIG. 4 is a schematic structural diagram of an image processing network according to at least one embodiment of the present disclosure;

For example, in at least one embodiment of the present disclosure, the image processing network may be any neural network model structure, also called a preprocessing model. For example, the network model structure is illustrated in FIG. 4. For example, as illustrated in FIG. 4, the image processing network (e.g., the preprocessing model) includes a plurality of first image analysis modules and one second image analysis module. For example, each first image analysis module includes the first convolutional layer Conv (k3f64), an average pooling layer AvgPool, an activation layer ReLU, and a instance regularization normalization layer IN. The second image analysis module includes the second convolutional layer Conv (k3f3) and the global average pooling layer GlobalAvgPool. In the example illustrated in FIG. 4, k3f64 in the first convolutional layer Conv (k3f64) represents the convolution kernel k=3, the number of output channels f=64, and k3f3 in the second convolutional layer Conv (k3f3) represents the convolution kernel k=3, the number of output channels f=3.

For example, in the example illustrated in FIG. 4, the global average pooling layer GlobalAvgPool in the second image analysis module average pools the feature maps output by the second convolutional layer Conv (k3f3) into parameters w1, w2 and w3 in the display parameter set.

It should be noted that the image processing network illustrated in FIG. 4 is only an example. In the embodiments of the present disclosure, the image processing network may adopt the architecture of any neural network model, and is not limited to the model architecture illustrated in FIG. 4, which is not limited in the embodiments of the present disclosure.

It should also be noted that the image processing network may include a plurality of first image analysis modules, for example, the number of the first image analysis modules may be set as 3-6, and the embodiments of the present disclosure do not limit the number of first image analysis modules. For example, in an example, the image processing network may include four first image analysis modules.

For example, in at least one embodiment of the present disclosure, the display parameter set corresponding to the current video segment is obtained by inputting the initial video frame (e.g., the video frame that is the most forward) of the current video segment into the image processing network (the preprocessing model). Through the display parameter set, the current video segment can be preprocessed, so that a HDR video with the desired effects can be finally generated.

For example, in at least one embodiment of the present disclosure, the first display parameter set includes the first display parameter w1, the second display parameter w2, and the third display parameter w3. The first display parameter w1 and the third display parameter w3 are used to adjust the brightness of the video frame and the second display parameter w2 is used to adjust the contrast of the video frame. For example, in some examples, the first display parameter w1 is used to adjust the overall brightness level of the video frame, and the third display parameter w3 is used to locally adjust (fine-tune) the brightness level of the video frame. For example, in some examples, when the value of the first display parameter w1 is greater than 1, the overall brightness level of the current video frame image can be increased, when the value of the first display parameter w1 is less than 1, the overall brightness level of the current video frame image can be reduced. For example, in some examples, when the value of the second display parameter w2 is greater than 1, the contrast of the current video frame image can be increased, and when the value of the second display parameter w2 is less than 1, the contrast of the current video frame image can be reduced. For example, in some examples, when the value of the third display parameter w3 is greater than 0, the brightness level of the current video frame image can be increased, and when the value of the third display parameter w3 is less than 0, the brightness level of the current video frame image can be reduced.

It should be noted that the first display parameter w1, the second display parameter w2, or the third display parameter w3 are not limited to a specific one or a certain type of display parameters or a specific order.

It should also be noted that in the embodiments of the present disclosure, the display parameter set may also include other display parameters, such as display parameters for adjusting color components, and the like, which are not limited in the embodiments of the present disclosure, and may be set according to actual conditions.

For example, in at least one embodiment of the present disclosure, for step S103, adjusting other frames in the video segment to which the one frame belongs based on the display parameter set to acquire an intermediate video segment, includes: adjusting all video frame data in each video segment according to the display parameter set corresponding to each video frame based on the following equation (2).

For example, in at least one embodiment of the present disclosure, a preprocessing operation is performed on the video frame data in the divided video segment. For example, in some examples, the following equation (2) is applied to each frame of the current video frame, so as to acquire the corresponding intermediate video segment.

$$X_{out} = w1 \times X_{in}^{w2} + w3 \tag{2}$$

In the equation (2) above, $X_{in}$ represents the input frame and $X_{out}$ represents the corresponding output frame. w1, w2, and w3 represent the first display parameter, the second display parameter, and the third display parameter respectively.

For example, in at least one embodiment of the present disclosure, by the display parameter set and the above equation (2), each video frame in the video segment for a certain scene can be preprocessed/adjusted, so that the processed/adjusted video frame has the brightness and contrast range that can be input by the subsequent HDR model (also referred to as a video processing network herein). Such that, more scene videos can be processed by a single HDR model.

For example, in at least one embodiment of the present disclosure, the operation of step S103 corresponds to a preprocessing operation or a preprocessing model (an image processing network). For example, the preprocessing operation may use the above equation (2) to calculate the output, or may use other equations or algorithms to calculate the output, which is not limited in embodiments of the present disclosure, and may be set according to actual needs. For another example, the preprocessing model may be a neural network, which is not limited in embodiments of the present disclosure, and may be set according to actual needs.

For example, in at least one embodiment of the present disclosure, for different video segments of different scenes, any image frame in the current video segment is taken out, for example, the frontmost image frame in the current video segment, and then input to the neural network (e.g., the preprocessing model), so that the first display parameter w1, the second display parameter w2, and the third display parameter w3 can be obtained after training.

For example, at least one implementation of the present disclosure provides a training method for an image processing network (the preprocessing model) and a video processing network (the HDR model).

For example, in one embodiment, the first sample data is acquired, the first sample data includes a first version SDR image and a first version HDR image, the first version HDR image corresponding to the first version SDR image is used as the first version ground truth image. The first version SDR image is input into the video processing network to acquire the first version predicted image corresponding to the first version SDR image. The first version predicted HDR image and the first version ground truth image are input into the first loss function to acquire the first loss function value, and the model parameter of the video processing network (i.e., the above-mentioned HDR model) is adjusted based on the first loss function value. The second sample data is acquired, the second sample data includes the second version SDR image and the second version HDR image, the second version HDR image corresponding to the second version SDR image is used as the second version ground truth image. The second version SDR image is input into the image processing network (i.e., the above preprocessing model) and the video processing network that has been trained (i.e., the above HDR model) to acquire the second version predicted HDR image corresponding to the second version SDR image. The parameter of the video processing network is fixed. The second version predicted HDR image and the second version ground truth image are input into the second loss function to acquire the second loss function value, and the model parameters of the image processing network are adjusted based on the second loss function value.

For example, in at least one embodiment of the present disclosure, the model parameters of the HDR model are adjusted through the first sample data, then the model parameters of the image processing network (the preprocessing model) are adjusted through the second sample data, and the parameters of the HDR model are fixed.

It should be noted that, in the embodiments of the present disclosure, the first version ground truth image, the second version ground truth image, and the third version ground truth image may be the standard/desired HDR images corresponding to the first version SDR image, the second version SDR image, and the third version SDR image, respectively, for example, an HDR image processed by a professional colorist, an HDR image that meets the requirements of a customer/designer, and the like, which are not limited in the embodiments of the present disclosure, and may be set according to actual needs.

It should also be noted that in the embodiments of the present disclosure, the terms "first sample data", "second sample data", and "third sample data" are not limited to a specific one or a certain type of sample data, or a specific order, and may be set according to the actual conditions. The terms "first version SDR image", and "second version SDR image" and "third version SDR image" are not limited to a specific one or a certain type of SDR image, or a specific order and may be set according to the actual conditions. The terms "first version HDR image", "second version HDR image", and "third version HDR image" are not limited to a specific one or a certain type of HDR image, or a specific order, and may be set according to the actual conditions.

It should also be noted that, in the embodiments of the present disclosure, the first loss function and the second loss function may be the same or different. The first loss function and the second loss function can adopt any loss function, such as the square loss function, the logarithmic loss function, the exponential loss function, and the like, which are not limited in the embodiments of the present disclosure, and may be set according to actual conditions.

Figure 5:
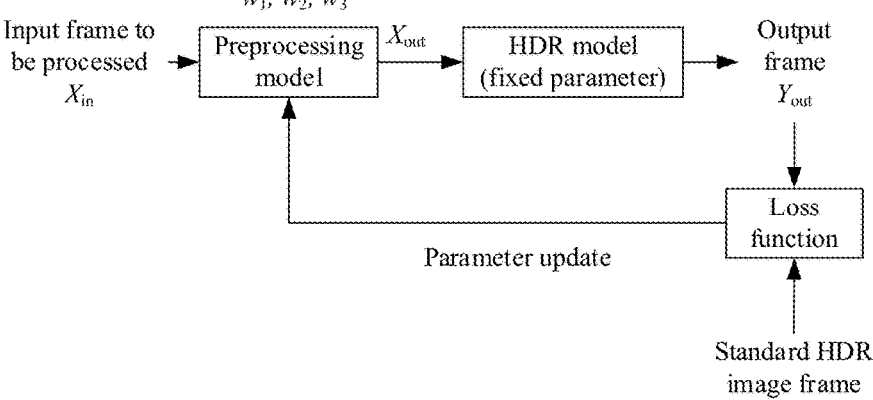
FIG. 5 is a schematic diagram of a training process of an image processing network according to at least one embodiment of the present disclosure.

FIG. 5 is a schematic diagram of a training process of a preprocessing model according to at least one embodiment of the present disclosure. For example, in at least one embodiment of the present disclosure, as illustrated in FIG. 5, the video frame to be processed/the video frame $X_{in}$ is input to the preprocessing model to obtain display parameters w1, w2, and w3, and the output frame $X_{out}$ is obtained based on the above equation (2). The output frame $X_{out}$ after being preprocessed is input into the HDR model, that is, an HDR image generation algorithm is applied to the output frame $X_{out}$ after being preprocessed to finally generate the output frame $Y_{out}$. The output frame $Y_{out}$ output by the HDR model is compared with the standard corresponding HDR image, for example, by calculating through a loss function. According to the comparison result, the display parameters output by the preprocessing model are adjusted/updated, such as the first display parameter w1, the second display parameter w2, and the third display parameter w3. After a plurality of training iterations, a desired display parameter set can be obtained, which, for example, makes the output frame $Y_{out}$ close to the standard corresponding HDR image.

For example, in at least one embodiment of the present disclosure, during the training of the display parameter set, the parameters of the HDR model are fixed parameters and do not need to be updated. That is, during the training of display parameters, the parameters in the HDR image generation algorithm keep constant. For example, in some examples, the HDR model is a model that has already been trained and is only used for mapping and color processing of the HDR image. It should be noted that the embodiments of the present disclosure do not specifically limit each parameter in the HDR model, and may be set according to actual conditions.

It should be noted that, in the embodiments of the present disclosure, a standard HDR image refers to an HDR image that meets the expectation, for example, an HDR image processed by a professional colorist, an HDR image that meets the requirements of a customer/designer, and the like. The embodiments of the present disclosure do not limit this, and it may be set according to actual needs.

For example, in another embodiment, the third sample data is acquired, the third sample data includes the third version SDR image and the third version HDR image; the third version HDR image corresponding to the third version SDR image is used as the third version ground truth image. The third version SDR image is input into the image processing network and the video processing network to acquire the third version predicted HDR image corresponding to the third version SDR image, and the third version predicted HDR image and the third version ground truth image are input into the third loss function to acquire the third loss function value. The model parameters of the image processing network and the video processing network are adjusted based on the third loss function value.

For example, in at least one embodiment of the present disclosure, the model parameters of the HDR model and the preprocessing model are simultaneously adjusted through a set of sample data (the third sample data).

It should be noted that, in the embodiments of the present disclosure, the first loss function, the second loss function, and the third loss function may be the same or different from each other, which are not limited in the embodiments of the present disclosure. The first loss function, the second loss function, and the third loss function can use any loss function, such as square loss function, logarithmic loss function, exponential loss function, and the like, which are not limited in the embodiments of the present disclosure, and may be set according to actual conditions.

Figure 6:
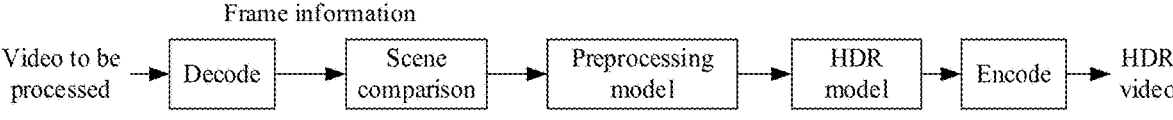
FIG. 6 is a schematic block diagram of another method for HDR video generation according to at least one embodiment of the present disclosure.

FIG. 6 is a schematic block diagram of another method for HDR video generation according to at least one embodiment of the present disclosure;

For example, in at least one embodiment of the present disclosure, as illustrated in FIG. 6, the decoded initial video (i.e., the video to be processed) is scene-partitioned (e.g., by applying the SSIM algorithm) and then input to the preprocessing model. The preprocessing model determines that the video scene has been switched, and it is currently the first frame of the new scene. The preprocessing model processes the first frame of the current new scene to obtain the display parameters w1, w2, and w3. Thereafter, all frames of the current scene are adjusted/preprocessed using the display parameter set (w1, w2, and w3) until the last frame at the end of the scene. When the next scene is entered, the operations are repeated, thereby preprocessing/adjusting the entire video to be processed, that is, preprocessing the output video. Therefore, before inputting the video into the HDR model, the initial video is preprocessed, and the brightness, contrast, and the like of the initial video are adjusted, so that the adjusted initial video meets the input requirements of the subsequent HDR model (e.g., close to or fall into the imputable brightness range, contrast range, and the like of the subsequent HDR model), thus a single HDR model can process the initial video with complex scenes, effectively improving the quality and efficiency of generating HDR video.

For example, in at least one embodiment of the present disclosure, a video segment corresponding to a scene in the initial video adopts a display parameter set. For example, in some examples, different video segments corresponding to different scenes in the initial video adopt different display parameter sets, and for example, in other examples, some different video segments corresponding to different scenes adopt the same display parameter set. The embodiments do not limit this, and it can be adjusted according to actual needs.

For example, in at least one embodiment of the present disclosure, the HDR image generation algorithm can be implemented by various neural network models, such as HDR models. It should be noted that, the embodiments of the present disclosure do not limit the HDR image generation algorithm or the specific network structure of the HDR model, as long as the HDR image can be generated.

For example, in at least one embodiment of the present disclosure, for step S104, performing a high dynamic range conversion on the intermediate video segment to acquire a high dynamic range video segment, includes: performing a high dynamic range conversion on the intermediate video segment using a video processing network. The video processing network includes a basic network and a weight network, the basic network is used to perform feature extraction and feature reconstruction on an input frame to acquire a high dynamic range output frame, and the weight network is used to perform feature extraction on the input frame to acquire a feature matrix parameter, and perform information rectification on the basic network based on the feature matrix parameter.

For example, in the embodiments of the present disclosure, the basic network may be any deep learning network capable of converting the SDR video to the HDR video in the prior art. For example, the residual network (ResNet), the cycle generative adversarial network (CycleGAN), and the pixel to pixel generative network (Pixel2Pixel) are algorithmic models for image-to-image translation. For example, the high dynamic range network (HDRNet), the conditional sequential retouching network (CSRNet), and the adaptive 3D lookup table (Ada-3DLUT) network are algorithmic models for photo retouching. As another example, the deep super-resolution inverse tone-mapping (Deep SR-ITM) and the GAN-based joint super-resolution and inverse tone-mapping (JSI-GAN) are algorithmic models for converting the SDR video to the HDR video. Embodiments of the present disclosure do not limit the specific structure of the basic network, as long as it contains a plurality of feature fusion nodes for fusion with the weight information, and can realize the conversion between the SDR video and the HDR video.

Figure 7:
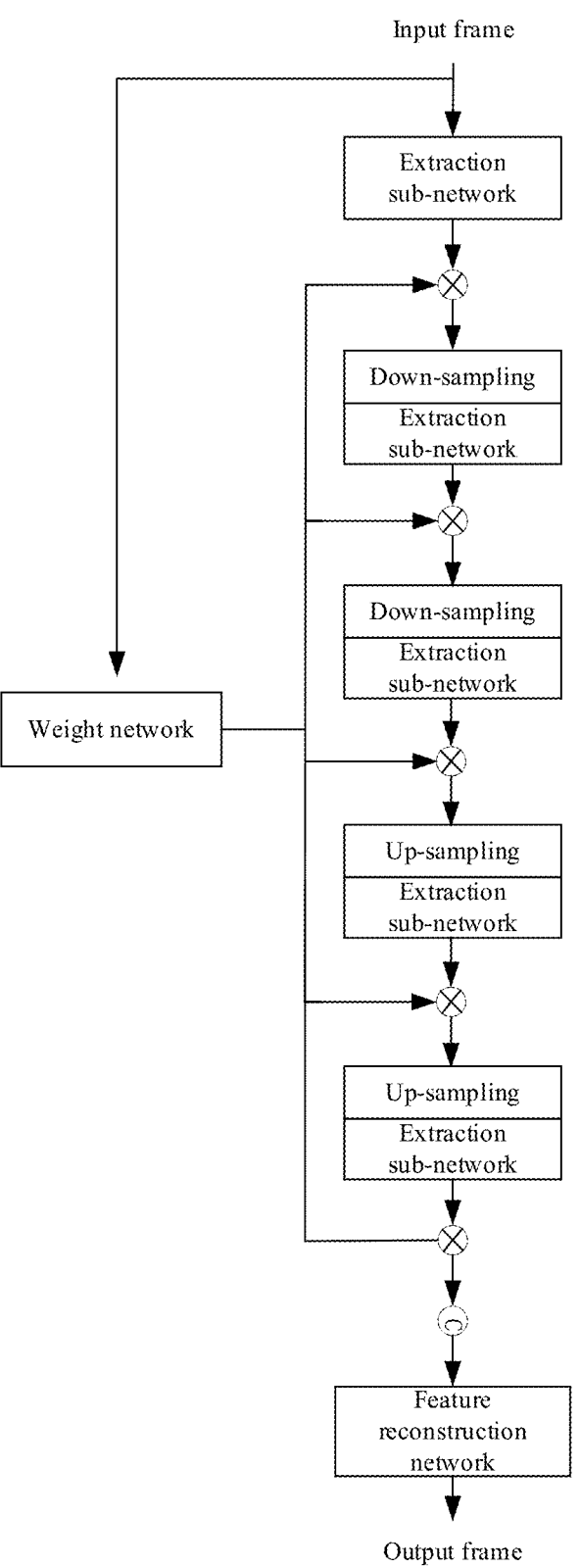
FIG. 7 is a schematic block diagram of an HDR model according to at least one embodiment of the present disclosure.

FIG. 7 is a schematic block diagram of a video processing network (HDR model) according to at least one embodiment of the present disclosure;

For example, in at least one embodiment of the present disclosure, as illustrated in FIG. 7, a video processing network (HDR model) includes a basic network and a weight network. For example, in at least one embodiment of the present disclosure, the basic network includes a feature extraction network and a feature reconstruction network. For example, in some examples, as illustrated in FIG. 7, the feature extraction network includes a plurality of extraction sub-networks, for example, five extraction sub-networks.

The video processing network illustrated in FIG. 7 includes two branches. The right branch is the basic network, which is to implement the conversion from SDR image or LDR image to HDR image, that is, to complete the generation task of HDR image. For example, the basic network is used to perform feature extraction and feature reconstruction on the input frame to acquire a high dynamic range output frame. The left branch is the weight network, which is to implement the information rectification of the basic network. For example, the weight network is used to perform feature extraction on the input frame to acquire a feature matrix parameter, and perform information rectification on the basic network based on the feature matrix parameter.

For example, in at least one embodiment of the present disclosure, the video processing network (HDR model) may only include a single branch, for example, only include the right branch in FIG. 7, that is, the basic network, and the embodiments of the present disclosure do not limit this as long as the HDR image generation task can be completed, and may be set according to actual conditions.

For example, in at least one embodiment of the present disclosure, the basic network illustrated in FIG. 7 adopts a UNET network structure. Usually, the UNET network structure has two symmetrical parts. When the first half of the network calculates the feature information image, the feature information image is down-sampled, and in order to ensure that the size of the network output is equal to the size of the input, the feature information is up-sampled by the second half of the UNET network structure. The up-sampling task is usually done by deconvolution or linear interpolation. Such that, the input image returns to the same form as the input after the process of encoding and decoding, that is, after the process of dimensionality reduction and abstraction, to complete the regression task.

For example, in at least one embodiment of the present disclosure, the basic network includes at least one information conditioning node, and the information conditioning node is used to integrate the feature extraction information of the basic network for the input frame and the feature matrix parameter information of the weight network. For example, in at least one embodiment of the present disclosure, the basic network includes the first information conditioning node, the second information conditioning node, the third information conditioning node, the fourth information conditioning node, and the fifth information conditioning node.

For example, as illustrated in FIG. 7, the node ⊗ that combines the weight network and the basic network is the above-mentioned information conditioning node, which represents the point-to-point multiplication of the feature matrices, and another node © represents the rearrangement and combination of feature channels, that is, the connection layer. In the example illustrated in FIG. 7, the basic network includes five information conditioning nodes. For example, in one example, the five information conditioning nodes illustrated in FIG. 7 are, in the order from top to bottom, the first information conditioning node, the second information conditioning node, the third information conditioning node, the fourth information conditioning node, and the fifth information conditioning node. It should be noted that the embodiments of the present disclosure do not limit the number of information conditioning nodes, which may be set according to actual conditions.

For example, in at least one embodiment of the present disclosure, the feature reconstruction network in the HDR model illustrated in FIG. 7 is to convert the image feature into video frame information for output. For example, in some examples, the simplest feature reconstruction network may use one layer of convolutional layer Conv, or a concatenation of multi-layer convolution-activation functions Conv-ReLU, or a concatenation of residual networks, as long as the purpose of outputting the video frame can be achieved, and the embodiments of the present disclosure are not limited to this, and may be set according to the actual needs.

For example, in at least one embodiment of the present disclosure, a weight network is used in the video processing network (HDR model) illustrated in FIG. 7. For example, there are many scenes in the video, including daytime, night, indoor, outdoor, sports, still, people, animals, and the like. In order to make a single HDR model adapt to the video frame information in different scenes as much as possible, the weight network is used, so that the information of the current video frame is fully used, and the information rectification is performed on the parameters of the basic network.

It should be noted that the HDR model architecture illustrated in FIG. 7 is just an example. In the embodiments of the present disclosure, the HDR model may adopt any neural network model architecture, and is not limited to the model architecture illustrated in FIG. 7, which is not limited in the embodiments of the present disclosure.

Figure 8:
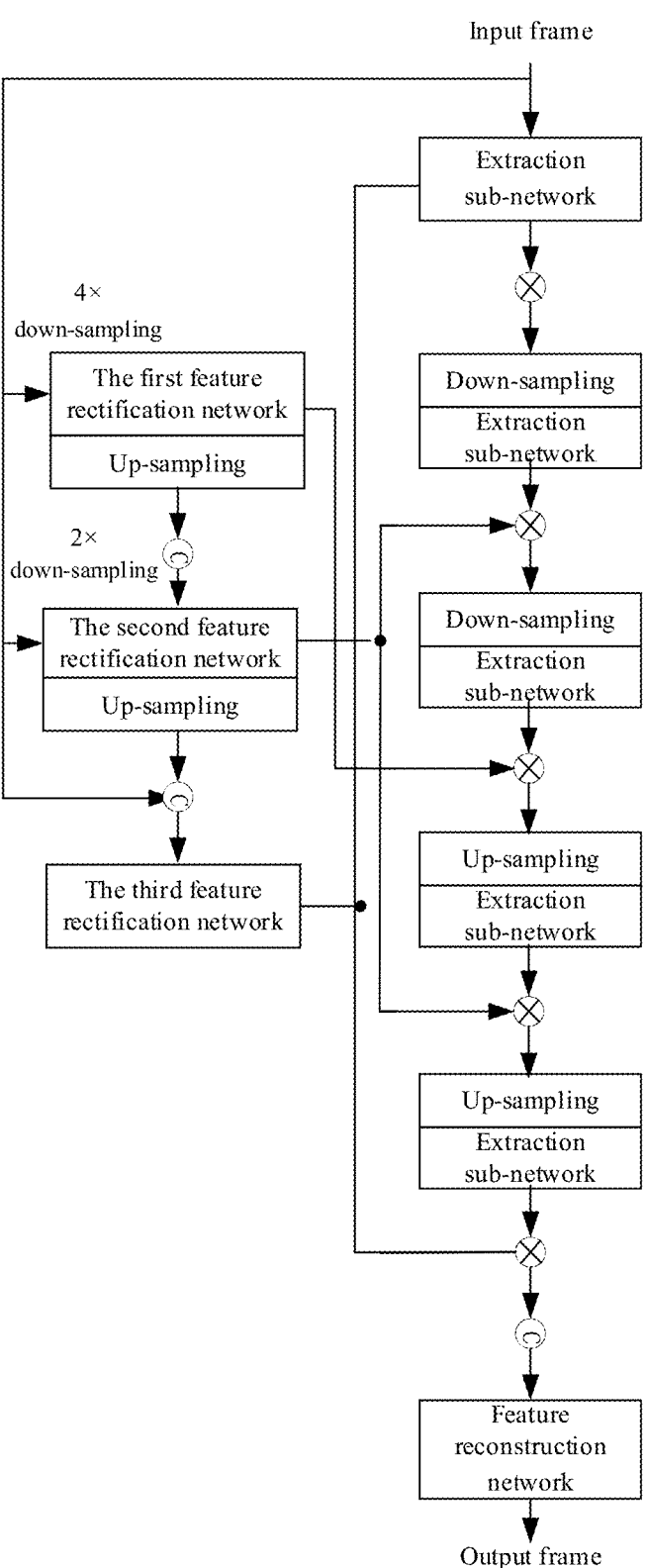
FIG. 8 is a schematic block diagram of another HDR model according to at least one embodiment of the present disclosure.

FIG. 8 is a schematic block diagram of another video processing network (HDR model) according to at least one embodiment of the present disclosure;

For example, in at least one embodiment of the present disclosure, as illustrated in FIG. 8, in addition to the UNET network structure used in the basic network, the weight network in the HDR model also uses the UNET network structure, thereby implementing the information rectification at different scales. For example, in the method provided by at least one embodiment of the present disclosure, the weight network includes at least one feature rectification network, and the sizes of corresponding input images of the at least one feature rectification network are different from each other.

For example, in at least one embodiment of the present disclosure, as illustrated in FIG. 8, the weight network includes the first feature rectification network, the second feature rectification network, and the third feature rectification network. the input frame is input into the first feature rectification network to acquire the first feature parameter matrix, the first feature parameter matrix is input into the third information conditioning node. The first feature parameter matrix and the input frame after being feature channel rearranged are input into the second feature rectification network to acquire the second feature parameter matrix. The second feature parameter matrix is input into the second information conditioning node and the fourth information conditioning node, and the second feature parameter matrix and the input frame after being feature channel rearranged are input into the third feature rectification network to acquire the third feature parameter matrix. The third feature parameter matrix is input into the first information conditioning node and the fifth information conditioning node. Similar to FIG. 7, in the example illustrated in FIG. 8, the node ⊗ that combines the weight network and the basic network is the above-mentioned information conditioning node, which represents the point-to-point multiplication of the feature matrices, and another node © represents the rearrangement and combination of feature channels, that is, the connection layer.

For example, in the HDR model illustrated in FIG. 8, the input frame is input to three rectification networks (the first feature rectification network, the second feature rectification network, and the third feature rectification network), after a 4× (4 times) down-sampling, a 2× (2 times) down-sampling, and a no-sampling operation, respectively, and the sizes of the corresponding input images of the three rectification networks are different from each other, so that the first feature rectification network, the second feature rectification network, and the third feature rectification network can respectively provide different sizes of information rectification. It should be noted that, in the example structures illustrated in FIG. 7 and FIG. 8, up-sampling and down-sampling represent 2× up-sampling and 2× down-sampling respectively.

For example, in at least one embodiment of the present disclosure, as illustrated in FIG. 8, the input frame has a size of 64×64, and for the right branch (the basic network), the image size output by the first extraction sub-network in top-to-bottom order is 64×64. After the first 2× down-sampling, the image size output by the second extraction sub-network in top-to-bottom order is 32×32. After the second 2× down-sampling, the image size output by the third extraction sub-network in top-to-bottom order is 16×16. After the first 2× up-sampling, the image size output by the fourth extraction sub-network in top-to-bottom order is 32×32. After the second 2× up-sampling, the image size output by the fifth extraction sub-network in top-to-bottom order is restored to the same size as that of the input frame, that is, 64×64. For the left branch (the weight network), the input frame of size 64×64 is down sampled by 4 times to obtain an image with the size of 16×16. Therefore, the first rectification network in top-to-bottom order illustrated in FIG. 8 can provide the rectification with a size of 16×16. The input frame with a size of 64×64 is down-sampled by 2 times to obtain an image with the size of 32×32. Therefore, the second rectification network in top-to-bottom order illustrated in FIG. 8 can provide the rectification with the size of 32×32. The third rectification network in top-to-bottom order illustrated in FIG. 8 can provide the rectification with the size of 64×64. For example, as illustrated in FIG. 8, the information rectification with different sizes output by the feature rectification networks is provided to intermediate results with the same size in the feature extraction networks, respectively. For example, in the top-to-bottom order, the information rectification output by the first rectification network (with the size of 16×16) is provided to the output of the third extraction sub-network (with the size of 16×16), the information rectification output by the second rectification network (with the size of 32×32) is provided to the output of the second and fourth extraction sub-networks (with the size of 32×32), and the information rectification of the output of the third rectification network (with the size of 64×64) is provided to the output of the first and fifth extraction sub-networks (with the size of 64×64).

In this way, the weight network can provide information rectification of different sizes (e.g., 16×16, 32×32, or 64×64) to the basic network.

For example, in at least one embodiment of the present disclosure, a weight network is used in the video processing network (HDR model) as illustrated in FIG. 8. For example, there are many scenes in the video, including daytime, night, indoor, outdoor, sports, still, people, animals, and the like. In order to make a single HDR model adapt to the video frame information in different scenes as much as possible, the weight network is used, so that the information of the current video frame is fully used, and the information rectification is performed on the parameters of the basic network.

It should be noted that the HDR model architecture illustrated in FIG. 8 is only an example. In the embodiments of the present disclosure, the HDR model may adopt any neural network model architecture, and is not limited to the model architecture illustrated in FIG. 8, which is not limited in the embodiments of the present disclosure.

Figure 9A:
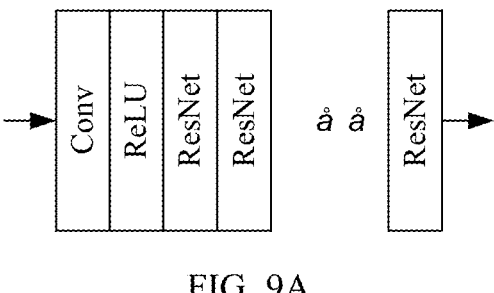
FIG. 9A is a schematic structural diagram of an extraction sub-network according to at least one embodiment of the present disclosure.
Figure 9B:
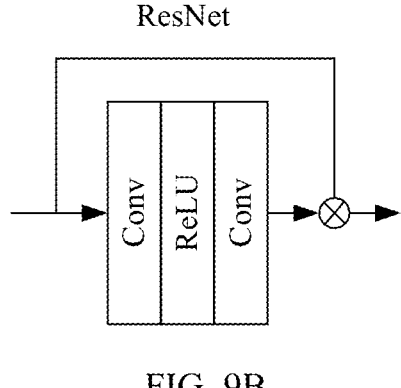
FIG. 9B is a schematic structural diagram of a residual network according to at least one embodiment of the present disclosure.

FIG. 9A is a schematic structural diagram of an extraction sub-network according to at least one embodiment of the present disclosure, and FIG. 9B is a schematic structural diagram of a residual network according to at least one embodiment of the present disclosure.

For example, in at least one embodiment of the present disclosure, as illustrated in FIG. 9A, an extraction sub-network includes a convolutional layer Conv, an activation layer ReLU, a plurality of residual networks ResNet, and the like. It should be noted that the feature extraction network illustrated in FIG. 9A is just an example. In the embodiments of the present disclosure, the extraction sub-network can adopt any reasonable architecture, and is not limited to the model architecture illustrated in FIG. 9A, which is not limited in the embodiments of the present disclosure, and may be set according to actual conditions.

For example, in at least one embodiment of the present disclosure, the structure of the residual network ResNet is illustrated in FIG. 9B. For example, the residual network ResNet includes a convolutional layer Conv, an activation function ReLU, and another convolutional layer Conv. It should be noted that the residual network illustrated in FIG. 9B is only an example. In the embodiments of the present disclosure, the residual network may adopt any reasonable architecture, and is not limited to the model architecture illustrated in FIG. 9B, which is not limited in the embodiments of the present disclosure, and may be set according to actual conditions.

For example, in at least one embodiment of the present disclosure, the weight network includes at least one feature rectification network, and the feature rectification network includes at least one attention module. The attention module performs feature extraction on the input information using two channels, which includes performing local feature extraction on the input frame using the first channel to acquire the first feature, performing global feature extraction on the input frame using the second channel to acquire the second feature, and fusing the first feature and the second feature to acquire the output information.

Figures 10A, 10B:
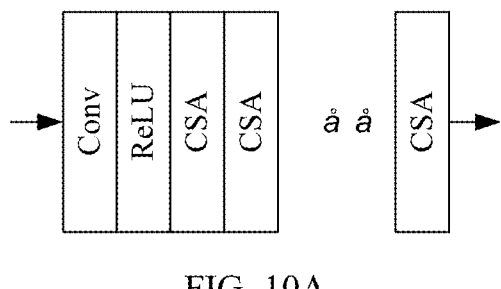
FIG. 10A is a schematic structural diagram of a rectification network according to at least one embodiment of the present disclosure.
FIG. 10B is a schematic structural diagram of an attention module according to at least one embodiment of the present disclosure.

FIG. 10A is a schematic structural diagram of a feature rectification network according to at least one embodiment of the present disclosure, and FIG. 10B is a schematic structural diagram of an attention module according to at least one embodiment of the present disclosure;

For example, in at least one embodiment of the present disclosure, as illustrated in FIG. 10A, the feature rectification network includes a convolutional layer Conv, an activation layer ReLU, and at least one attention (CSA) module. It should be noted that the feature rectification network illustrated in FIG. 10A is only an example. In the embodiments of the present disclosure, the feature rectification network can adopt any reasonable architecture, and is not limited to the model architecture illustrated in FIG. 10A, which is not limited in the embodiments of the present disclosure, and may be set according to actual conditions.

For example, in at least one embodiment of the present disclosure, as illustrated in FIG. 10B, the attention (CSA) module includes two branches (e.g., the first channel and the second channel), and one branch (the first channel) includes the class variance (cstd) module, the convolutional layer Conv, the pooling layer Pooling, the activation layer ReLU, the bilinear function (Bilinear), the Sigmoid function, and the first channel can perform local feature extraction on the input frame to obtain the first feature. The other branch (the second channel) includes a plurality of instance regularization normalization layers InsNorm, convolutional layers Conv, and activation layers ReLU, and the second channel can perform global feature extraction on the input frame to obtain the second feature. Through the node ⊗ illustrated in FIG. 10B, the first feature and the second feature are fused to obtain the output information.

It should be noted that the attention CSA module illustrated in FIG. 10B is just an example. In the embodiments of the present disclosure, the CSA module can adopt any reasonable architecture, and is not limited to the model architecture illustrated in FIG. 10B, which is not limited in the embodiments of the present disclosure, and may be set according to actual conditions.

For example, in at least one embodiment of the present disclosure, in the example structures illustrated in FIG. 9A, FIG. 9B, FIG. 10A, and FIG. 10B, the convolutional layer Conv adopts Conv (k3f64s1), with k3f64s1 denoting the convolutional kernel k=3, the number of output channels f=64, and the step size s=1. For example, the up-sampling illustrated in FIG. 7 and FIG. 8 can be implemented as a deconvolution layer DConv, for example, the deconvolution layer DConv is DConv(k3f64s2) with k3f64s2 denoting the convolution kernel k=3, the number of output channels f=64, and the step size s=2. Alternatively, the up-sampling illustrated in FIG. 7 and FIG. 8 can be implemented as an interpolation algorithm, e.g., Bilinear/Bicubic (2× up-sampling), in order to achieve 2× up-sampling. For example, the down-sampling illustrated in FIG. 7 and FIG. 8 can be implemented as pooling, the function Bilinear/Bicubic (2× down-sampling), or the convolutional layer Conv(k3f64s2), with k3f64s2 denoting the convolutional kernel k=3, the number of output channels f=64, and the step size s=2, in order to achieve 2× down-sampling. It should be noted that, in the embodiments of the present disclosure, the network structures described in FIG. 7 to FIG. 10B are exemplary, and the embodiments of the present disclosure do not limit this, and may be adjusted according to actual conditions.

It should be noted that the embodiments of the present disclosure do not limit the specific implementation manner of performing "up-sampling" or "down-sampling", as long as the "up-sampling" or "down-sampling" can be realized. It should also be noted that the embodiments of the present disclosure do not limit the specific multiples of up-sampling and down-sampling, which may be set according to actual needs.

For example, in at least one implementation of the present disclosure, as illustrated in FIG. 10B, the class variance cstd module is used in the attention CSA module, which can effectively use information such as the mean value and the variance of the current video frame, thereby achieving more effective information rectification.

For example, in at least one implementation of the present disclosure, the class variance cstd module provides the rectification based on each pixel value of the current video frame and the size of the current video frame. In this way, the feature rectification network can effectively use the information such as the mean value and the variance of the current video frame.

For example, in at least one implementation of the present disclosure, the class variance cstd module utilizes the following equation (3) to calculate the output:

$$O_x = \frac{x - u(x)}{Cstd(x)}, \tag{3}$$

$$Cstd(x) = \sqrt{\frac{1}{MN-1}\left(\left(\sum x_{i,j}^2\right) - \frac{1}{MN-1}\left(\sum x_{i,j}\right)^2\right)}$$

In the above equation (3), x represents the current video frame, u(x) represents the average value or mean value of the current video frame, M represents the width of the current video frame, N represents the height of the current video frame, $x_{i,j}$ represents the pixel with the coordinates (i, j) in the current video frame, Cstd(x) represents the correlation of the current video frame, and $O_x$ represents the output frame corresponding to the current video frame.

For example, at least one embodiment of the present disclosure provides a preprocessing model mechanism to dynamically adjust the video frames in the initial video, so that a single HDR model can process the initial video with complex scenes, thereby effectively improving the quality and efficiency of generating HDR video. For example, at least one embodiment of the present disclosure also provides the HDR model using the class variance cstd module, so that the feature rectification network of the HDR model can effectively use the information such as the mean value and variance of the current video frame. For another example, at least one embodiment of the present disclosure further provides the HDR model that adopts the UNET network structure as a whole, so that the feature rectification network of the HDR model can provide information rectification for different sizes.

It should also be noted that in the various embodiments of the present disclosure, the execution order of each step of the video frame interpolation processing method 10 is not limited. Although the execution process of each step is described in a specific order above, this does not constitute a limitation on the embodiments of the present disclosure. The various steps in the method for video processing 10 can be executed serially or in parallel, according to actual needs. For example, the method for video processing 10 may also include more or fewer steps, and the embodiments of the present disclosure do not limit this.

Figure 11:
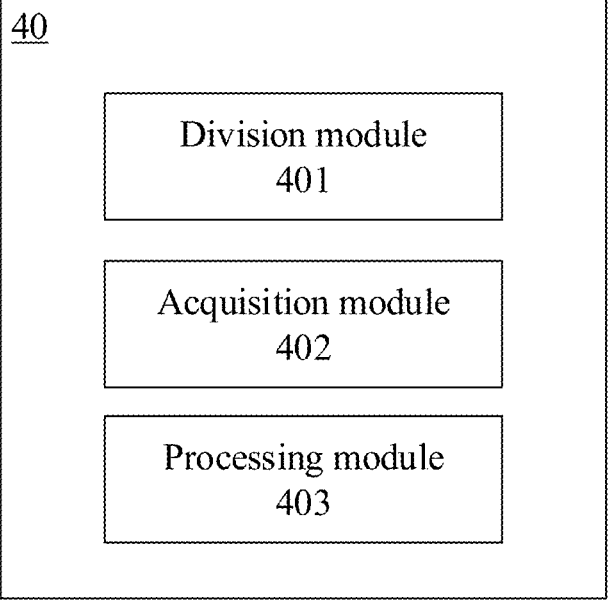
FIG. 11 is a schematic block diagram of an apparatus for video processing according to at least one embodiment of the present disclosure.

FIG. 11 is a schematic block diagram of an apparatus for video processing according to at least one embodiment of the present disclosure.

For example, in at least one embodiment of the present disclosure, as illustrated in FIG. 11, the apparatus for video processing 40 includes a division module 401, an acquisition module 402, and a processing module 403.

For example, in at least one embodiment of the present disclosure, the division module 401 is configured to divide a plurality of video frames in an initial video into a plurality of video segments. Each of the plurality of video segments comprises one or more video frames, and the plurality of video frames are consecutive. For example, the division module 401 can implement step S101, and the specific implementation method can refer to the related description of step S101, which is not repeated here. The acquisition module 402 is configured to determine, based on one frame of the one or more video frames, a display parameter set of a video segment to which the one frame belongs, and adjust other frames in the video segment to which the one frame belongs based on the display parameter set to acquire an intermediate video segment. For example, the acquisition module 402 may implement steps S102 and S103, and the specific implementation method can refer to the related description of steps S102 and S103, which is not repeated here. The processing module 403 is configured to perform a high dynamic range conversion on the intermediate video segment to acquire a high dynamic range video segment, and generate a high dynamic range video based on the high dynamic range video segment. For example, the processing module 403 may implement steps S104 and S105, and the specific implementation method can refer to the related description of steps S104 and S105, which is not repeated here.

It should be noted that the division module 401, the acquisition module 402, and the processing module 403 can be implemented through software, hardware, firmware, or any combination of them. For example, they can be respectively implemented as a division circuit 401, an acquisition circuit 402, and a processing circuit 403. The embodiments of the present disclosure do not limit the specific implementations of them.

It should be understood that the apparatus for video processing 40 provided by at least one embodiment of the present disclosure can implement the foregoing method for video processing 10, and can also achieve similar technical effects to the foregoing method for video processing 10. For example, the apparatus for video processing 40 provided by at least one embodiment of the present disclosure dynamically adjust the video frames in the initial video, so that a single HDR model can process the initial video with complex scenes, and thereby effectively improving the quality and efficiency of generating HDR video. For example, in the apparatus for video processing 40 provided by at least one embodiment of the present disclosure, the HDR model adopts the class variance cstd module, so that the feature rectification network of the HDR model can effectively use the information such as the mean value and variance of the current video frame. For another example, in the apparatus for video processing 40 provided by at least one embodiment of the present disclosure, the HDR model adopts a UNET network structure as a whole, so that the feature rectification network of the HDR model can provide information rectification for different sizes.

It should be noted that in the embodiments of the present disclosure, the apparatus for video processing 40 may include more or fewer circuits or units, and the connection relationship between each circuit or unit is not limited and can be determined according to actual needs. The specific composition of each circuit is not limited, and can be composed of analog devices based on circuit principles, digital chips, or other applicable methods.

Figure 12:
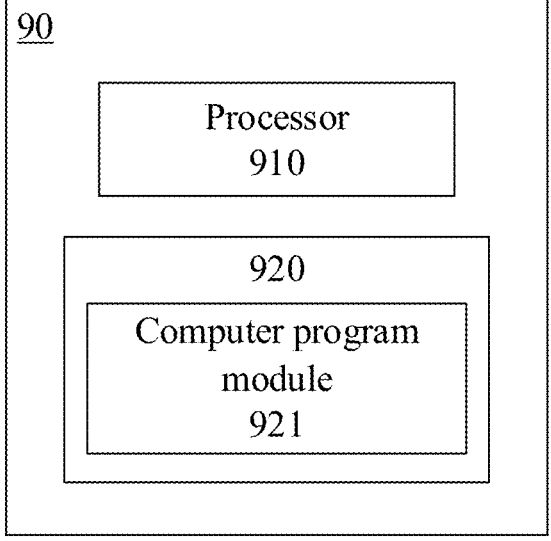
FIG. 12 is a schematic block diagram of another apparatus for video processing according to at least one embodiment of the present disclosure.

FIG. 12 is a schematic block diagram of another apparatus for video processing according to at least one embodiment of the present disclosure;

At least one embodiment of the present disclosure also provides an apparatus for video processing 90. As illustrated in FIG. 12, the apparatus for video processing 90 includes a processor 910 and a memory 920. The memory 920 includes one or more computer program modules 921. The one or more computer program modules 921 are stored in the memory 920 and are configured to be executed by the processor 910. The one or more computer program modules 921 include instructions for executing the method for video processing 10 provided by at least one embodiment of the present disclosure. When the instructions are executed by the processor 910, the processor 910 can execute one or more steps of the method for video processing 10 provided by at least one embodiment of the present disclosure. The memory 920 and the processor 910 can be interconnected through a bus system and/or other forms of connection mechanisms (not shown).

For example, the processor 910 may be a central processing unit (CPU), a digital signal processor (DSP), or other forms of processing unit with data processing and/or program execution capabilities, such as a field programmable gate array (FPGA). For example, the central processing unit (CPU) can be an X86 or ARM architecture. The processor 910 can be a general-purpose processor or a specialized processor, which can control other components in the apparatus for video processing 90 to perform the desired functions.

For example, the memory 920 may include any combination of one or more computer program products, which may include various forms of computer-readable storage medium, such as a volatile memory and/or a non-volatile memory. The volatile memory may include, for example, a random-access memory (RAM) and/or a cache memory. The non-volatile memory may include, for example, a read-only memory (ROM), a hard disk, an erasable programmable read-only memory (EPROM), a portable compact disc read-only memory (CD-ROM), a USB memory, a flash memory, and the like. One or more computer program modules 921 can be stored on a computer-readable storage medium, and the processor 910 can run one or more computer program modules 921 to implement various functions of the video frame insertion processing apparatus 90. In the computer-readable storage medium, various applications and data, as well as various data used and/or generated by applications, can also be stored. The specific functions and technical effects of the apparatus for video processing 90 can be referred to the description of the method for video processing 10 mentioned above, and will not be repeated here.

Figure 13:
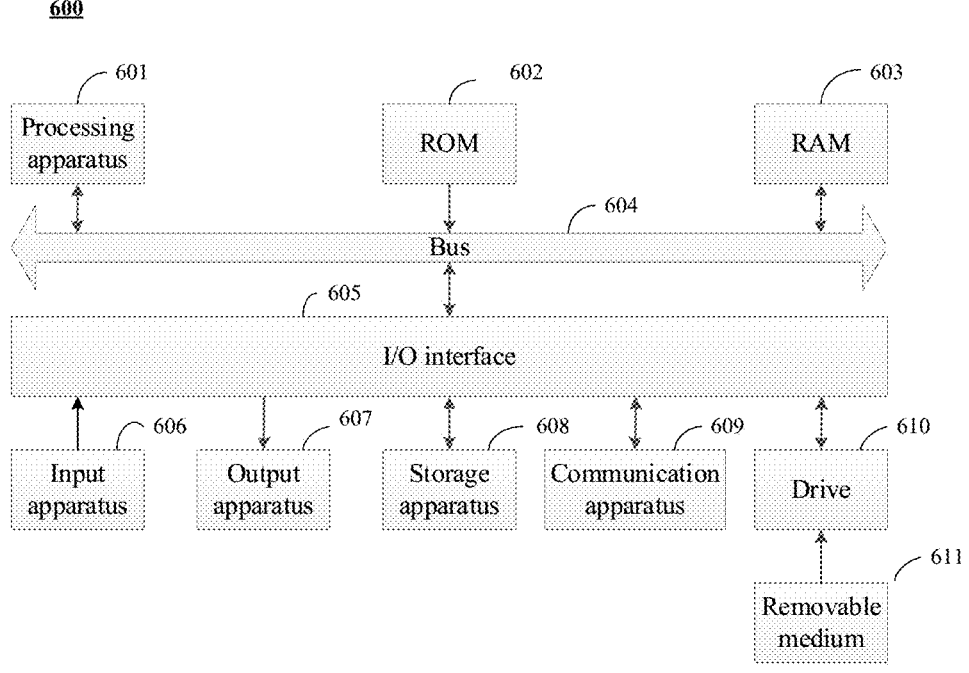
FIG. 13 is a schematic block diagram of still another apparatus for video processing according to at least one embodiment of the present disclosure.

FIG. 13 is a schematic block diagram of still another apparatus for video processing according to at least one embodiment of the present disclosure;

The terminal device in the embodiments of the present disclosure may include, but is not limited to, a mobile terminal such as a mobile phone, a laptop, a digital broadcasting receiver, a PDA (personal digital assistant), a PAD (portable Android device), a PMP (portable multimedia player), a car terminal (e.g., car navigation terminal), and a fixed terminal such as the digital TV, a desktop computer, and the like. The apparatus for video processing 600 illustrated in FIG. 13 is only an example and should not impose any limitations on the functionality and scope of use of the embodiments of the present disclosure.

For example, as illustrated in FIG. 13, in some examples, the apparatus for video processing 600 includes a processing apparatus (e.g., central processing unit, graphics processor, etc.) 601, which can perform various appropriate actions and processes based on programs stored in the read-only memory (ROM) 602 or programs loaded from the storage apparatus 608 into the random-access memory (RAM) 603. In RAM 603, various programs and data required for the computer system operation are also stored. The processing apparatus 601, the ROM 602, and the RAM 603 are connected through the bus 604. The input/output (I/O) interface 605 is also connected to the bus 604.

For example, the following components may be connected to I/O interface 605: an input apparatus 606 including, for example, a touch screen, a touch pad, a keyboard, a mouse, a camera, a microphone, an accelerometer, a gyroscope, and the like; an output apparatus 607 including, for example, a liquid crystal display (LCD), a speaker, a vibrator, and the like; a storage apparatus 608 including, for example, a magnetic tape, a hard disk, and the like; and a communication apparatus 609 including, for example, a network interface card such as a LAN card, a modem, and the like. The communication apparatus 609 may allow the apparatus for video processing 600 to communicate through the wired or wireless method with other devices to exchange data, and perform communication processing through a network such as the Internet. A drive 610 is also connected to the I/O interface 605 as needed. A removable medium 611, such as a disk, a CD-ROM, a magnetic disk, a semiconductor memory, and the like, are mounted to the drive 610 as needed to allow computer programs read therefrom to be mounted into the storage apparatus 608 as needed. Although FIG. 13 illustrates the apparatus for video processing 600 including various apparatus, it should be understood that there is no requirement to implement or include all of the illustrated apparatus. More or fewer apparatus may alternatively be implemented or included.

For example, the apparatus for video processing 600 may further include a peripheral interface (not shown), and the like. The peripheral interface may be of various types, such as a USB interface, a lighting interface, and the like. The communication apparatus 609 may communicate with networks and other devices through wireless communication, such as the Internet, an internal network, and/or a wireless network such as a cellular telephone network, a wireless local area network (LAN), and/or a metropolitan area network (MAN). The wireless communication may use any of various communication standards, protocols, and technologies, including but not limited to the global system for the global system for mobile communications (GSM), enhanced data GSM environment (EDGE), wideband code division multiple access (W-CDMA), code division multiple access (CDMA), time division multiple access (TDMA), Bluetooth, Wi-Fi (e.g., based on the IEEE 802.11a, IEEE 802.11b, IEEE 802.11g, and/or IEEE 802.11n standards), voice over internet protocol (VoIP), Wi-MAX, protocols for e-mail, instant messaging, and/or short message service (SMS), or any other suitable communication protocol.

For example, the apparatus for video processing 600 can be any device such as a cell phone, a tablet computer, a laptop computer, an e-book, a game console, a television, a digital photo frame, a navigator, and the like, or any combination of the data processing apparatus and hardware, and the embodiments of the present disclosure do not limit this.

For example, according to the embodiments of the present disclosure, the process described above with reference to the flowchart may be implemented as a computer software program. For example, the embodiments of the present disclosure include a computer program product that includes a computer program carried on a non-transient computer-readable medium, which includes program code for executing the method illustrated in the flowchart. In such embodiments, the computer program may be downloaded and installed from the network through the communication apparatus 609, or installed from the storage apparatus 608, or installed from ROM 602. When the computer program is executed by the processing apparatus 601, the method for video processing 10 in the embodiments of the present disclosure is executed.

It should be noted that the computer-readable medium mentioned in the present disclosure may be a computer-readable signal medium, a computer-readable storage medium, or any combination thereof. The computer-readable storage medium can be, for example, but not limited to, a system, a device, or an apparatus of electricity, magnetism, light, electromagnetism, infrared, or semiconductors, or a combination of any of the above. More specific examples of computer-readable storage medium may include, but are not limited to: an electrical connection with one or more wires, a portable computer disk, a hard drive, a random-access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combination of the above. In the embodiments of the present disclosure, the computer-readable storage medium may be any tangible medium containing or storing a program, which may be used by or in combination with an instruction execution system, apparatus, or device. In the embodiments of the present disclosure, the computer-readable signal medium may include a data signal propagated in the baseband or as part of a carrier carrying the computer-readable program code. Such propagated data signals may take various forms, including but not limited to an electromagnetic signal, an optical signal, or any suitable combination of the above. The computer-readable signal medium may also be any computer-readable medium other than a computer-readable storage medium, which can send, propagate, or transmit a program for use by or in combination with an instruction execution system, apparatus, or device. The program code contained on computer-readable medium can be transmitted using any suitable medium, including but not limited to: a wire, an optical cable, RF (radio frequency), and the like, or any suitable combination of the above.

The computer-readable medium mentioned above can be included in the apparatus for video processing 600. It can also exist separately without being assembled into the apparatus for video processing 600.

Figure 14:
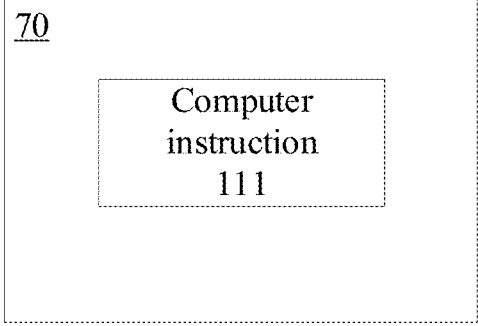
FIG. 14 is a schematic block diagram of a non-instantaneous readable storage medium according to at least one embodiment of the present disclosure.

FIG. 14 is a schematic block diagram of a non-instantaneous readable storage medium according to at least one embodiment of the present disclosure.

The embodiments of the present disclosure also provide a non-instantaneous readable storage medium. FIG. 14 is a schematic block diagram of a non-instantaneous readable storage medium according to at least one embodiment of the present disclosure. As illustrated in FIG. 14, a non-instantaneous readable storage medium 70 stores computer instructions 111, the computer instructions 111 upon execution by a processor, cause the processor to execute one or more steps of the method for video processing 10 as described above.

For example, the non-instantaneous readable storage medium 70 may be any combination of one or more computer-readable storage mediums, for example, a computer-readable storage medium includes a computer-readable program code for dividing a plurality of video frames in an initial video into a plurality of video segments. Another computer-readable storage medium includes a computer-readable program code for determining, based on one frame of the one or more video frames, a display parameter set of a video segment to which the one frame belongs; and adjusting other frames in the video segment based on the display parameter set to acquire an intermediate video segment. Still another computer-readable storage medium includes a computer-readable program code for performing a high dynamic range conversion on the intermediate video segment to acquire a high dynamic range video segment; and generating a high dynamic range video based on the high dynamic range video segment. Certainly, the above-mentioned program codes may also be stored in the same computer-readable medium, which is not limited by the embodiments of the present disclosure.

For example, when the program code is read by the computer, the computer can execute the program code stored in the computer storage medium, such as the method for video processing 10 provided in any embodiment of the present disclosure.

For example, the storage medium may include a smart phone, a storage component of a tablet computer, a hard disk of a personal computer, a random-access memory (RAM), a read-only memory (ROM), an erasable programmable read-only memory (EPROM), a portable compact disk read-only memory (CD-ROM), a flash memory, or any combination of the above storage mediums, and may also be other applicable storage mediums. For example, the readable storage medium can also be the memory 920 of FIG. 12, and the relevant description can refer to the previous content, which will not be repeated here.

Figure 15:
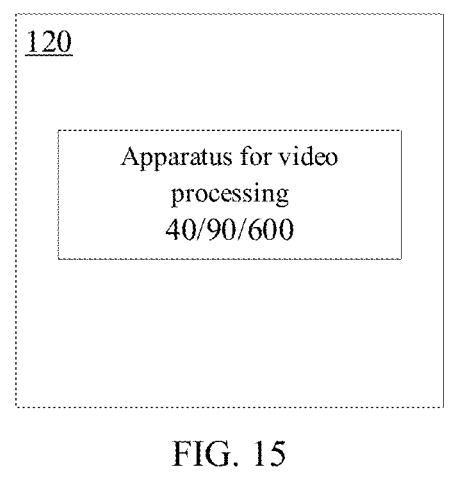

Embodiments of the present disclosure also provide an electronic device. FIG. 15 is a schematic block diagram of an electronic device according to at least one embodiment of the present disclosure. As illustrated in FIG. 15, the electronic device 120 may include the apparatus for video processing 40/90/600 as described above. For example, the electronic device 120 may implement the method for video processing 10 provided in any one embodiment of the present disclosure.

In the present disclosure, the term "plurality" refers to two or more, unless otherwise specified.

After considering the disclosure of the specification and practices disclosed herein, those skilled in the art will easily come up with other implementation solutions disclosed herein. The present disclosure is intended to cover any variations, uses, or adaptive changes of the present disclosure, which follow the general principles of the present disclosure and include common knowledge or commonly used technical means in the technical field that are not disclosed in the present disclosure. The specification and embodiments are only considered exemplary, and the true scope and spirit of the present disclosure are indicated by the following claims.

It should be understood that the present disclosure is not limited to the precise structure described above and illustrated in the drawings, and various modifications and changes can be made without departing from its scope. The scope of the present disclosure is limited only by the accompanying claims.

What is claimed is:

1. A method for video processing, comprising:
   dividing a plurality of video frames in an initial video into a plurality of video segments, wherein each of the plurality of video segments comprises one or more video frames, and the plurality of video frames are consecutive;
   determining, based on one frame of the one or more video frames, a display parameter set of a video segment to which the one frame belongs;
   adjusting other frames in the video segment to which the one frame belongs based on the display parameter set to acquire an intermediate video segment;
   performing a high dynamic range conversion on the intermediate video segment to acquire a high dynamic range video segment; and
   generating a high dynamic range video based on the high dynamic range video segment,
   wherein the dividing a plurality of video frames in an initial video into a plurality of video segments, comprises:
   calculating a similarity between each video frame and a previous video frame in turn according to a playback order for the plurality of video frames in the initial video; and
   dividing the initial video into the plurality of video segments based on a calculated similarity between every two adjacent video frames.

2. The method according to claim 1, wherein the display parameter set comprises a first display parameter, a second display parameter, and a third display parameter, the first display parameter and the third display parameter are used to adjust a brightness of a video frame, and the second display parameter is used to adjust a contrast of the video frame.

3. The method according to claim 2, wherein the first display parameter is used to adjust an overall brightness level of the video frame, and the third display parameter is used to locally adjust a brightness level of the video frame.

4. The method according to claim 1, wherein before the calculating the similarity between each video frame and a previous video frame in turn according to the playback order for the plurality of video frames in the initial video, the method further comprises:
   performing a dimensionality reduction process on each initial video frame in the initial video to acquire the plurality of video frames.

5. The method according to claim 1, wherein the calculating the similarity between each video frame and a previous video frame in turn, comprises:
   for a video frame in the plurality of video frames, based on a mean value of image data of the video frame and a mean value of image data of the previous video frame, a standard deviation of the image data of the video frame and a standard deviation of the image data of the previous video frame, and a covariance of the image data of the video frame and the image data of the previous video frame, determining a structural similarity between the video frame and the previous video frame; and
   determining a similarity between the video frame and the previous video frame based on the structural similarity between the video frame and the previous video frame.

6. The method according to claim 1, wherein the determining, based on one frame of the one or more video frames, the display parameter set of the video segment to which the one frame belongs, comprises:
   performing parameter analysis on an initial video frame using an image processing network to acquire the display parameter set;
   wherein the image processing network comprises a first image analysis module and a second image analysis module;
   the first image analysis module is used for performing feature extraction on the initial video frame to acquire a first intermediate video frame; and
   the second image analysis module is used for performing the feature extraction and scale transformation on the first intermediate video frame to output the display parameter set.

7. The method according to claim 6, wherein the first image analysis module comprises a first convolutional layer, an average pooling layer, an activation layer, and an instance regularization normalization layer, and the second image analysis module comprises a second convolutional layer and a global average pooling layer.

8. The method according to claim 6, wherein the image processing network comprises a plurality of the first image analysis modules.

9. The method according to claim 1, wherein the adjusting other frames in the video segment to which the one frame belongs based on the display parameter set to acquire an intermediate video segment, comprises:
   adjusting all video frame data in each video segment according to a display parameter set corresponding to each video frame based on a following equation:

$$X_{out} = w1 \times X_{in}^{w2} + w3,$$

wherein $X_{in}$ represents an input frame, $X_{out}$ represents an output frame, and w1, w2, and w3 are respectively a first display parameter, a second display parameter, and a third display parameter.

10. The method according to claim 1, wherein the performing a high dynamic range conversion on the intermediate video segment to acquire a high dynamic range video segment, comprises:

performing the high dynamic range conversion on the intermediate video segment using a video processing network;

wherein the video processing network comprises a basic network and a weight network;

the basic network is used to perform feature extraction and feature reconstruction on an input frame to acquire a high dynamic range output frame; and the weight network is used to perform feature extraction on the input frame to acquire a feature matrix parameter, and perform information rectification on the basic network based on the feature matrix parameter.

11. The method according to claim 10, wherein the basic network comprises at least one information conditioning node, and the information conditioning node is used to integrate feature extraction information of the basic network for the input frame and feature matrix parameter information of the weight network.

12. The method according to claim 11, wherein the basic network comprises a first information conditioning node, a second information conditioning node, a third information conditioning node, a fourth information conditioning node, and a fifth information conditioning node.

13. The method according to claim 10, wherein the weight network comprises at least one feature rectification network, the feature rectification network comprises at least one attention module; and the attention module performing feature extraction on input information using two channels, comprises:

performing local feature extraction on the input frame using a first channel to acquire a first feature;

performing global feature extraction on the input frame using a second channel to acquire a second feature; and fusing the first feature and the second feature to acquire output information.

14. The method according to claim 10, wherein the weight network comprises a first feature rectification network, a second feature rectification network, and a third feature rectification network, the method further comprises:

inputting the input frame into the first feature rectification network to acquire a first feature parameter matrix;

inputting the first feature parameter matrix into a third information conditioning node;

inputting the first feature parameter matrix and the input frame after being feature channel rearranged into the second feature rectification network to acquire a second feature parameter matrix;

inputting the second feature parameter matrix into a second information conditioning node and a fourth information conditioning node;

inputting the second feature parameter matrix and the input frame after being feature channel rearranged into the third feature rectification network to acquire a third feature parameter matrix; and inputting the third feature parameter matrix into a first information conditioning node and a fifth information conditioning node.

15. The method according to claim 6, further comprising:

acquiring first sample data, wherein the first sample data comprises a first version SDR image and a first version HDR image, and the first version HDR image corresponding to the first version SDR image is used as a first version ground truth image;

inputting the first version SDR image into a video processing network to acquire a first version predicted image corresponding to the first version SDR image;

inputting the first version predicted HDR image and the first version ground truth image into a first loss function to acquire a first loss function value; and adjusting a model parameter of the video processing network based on the first loss function value;

acquiring second sample data, wherein the second sample data comprises a second version SDR image and a second version HDR image, and the second version HDR image corresponding to the second version SDR image is used as a second version ground truth image;

inputting the second version SDR image into the image processing network and the video processing network that has been trained to acquire a second version predicted HDR image corresponding to the second version SDR image;

fixing a parameter of the video processing network;

inputting the second version predicted HDR image and the second version ground truth image into a second loss function to acquire a second loss function value; and adjusting a model parameter of the image processing network based on the second loss function value.

16. The method according to claim 6, further comprising:

acquiring third sample data, wherein the third sample data comprises a third version SDR image and a third version HDR image, and the third version HDR image corresponding to the third version SDR image is used as a third version ground truth image;

inputting the third version SDR image into the image processing network and the video processing network to acquire a third version predicted HDR image corresponding to the third version SDR image;

inputting the third version predicted HDR image and the third version ground truth image into a third loss function to acquire a third loss function value; and adjusting a model parameter of the image processing network and the video processing network based on the third loss function value.

17. An apparatus for video processing, comprising:

a division module, configured to divide a plurality of video frames in an initial video into a plurality of video segments, wherein each of the plurality of video segments comprises one or more video frames, and the plurality of video frames are consecutive;

an acquisition module, configured to determine, based on one frame of the one or more video frames, a display parameter set of a video segment to which the one frame belongs, and adjust other frames in the video segment to which the one frame belongs based on the display parameter set to acquire an intermediate video segment; and a processing module, configured to perform a high dynamic range conversion on the intermediate video segment to acquire a high dynamic range video segment, and generate a high dynamic range video based on the high dynamic range video segment, wherein the division module is further configured to:

calculate a similarity between each video frame and a previous video frame in turn according to a playback order for the plurality of video frames in the initial video; and divide the initial video into the plurality of video segments based on a calculated similarity between every two adjacent video frames.

18. An apparatus for video processing, comprising:

a processor; and a memory, comprising one or more computer program modules, wherein the one or more computer program modules are stored in the memory and are configured to be executed by the processor, and the one or more computer program modules comprise instructions for executing the method for video processing according to claim 1.

19. A non-transient computer readable storage medium storing computer instructions, wherein the computer instructions upon execution by a processor, cause the processor to execute the method for video processing according to claim 1.

* * * * *